United States Patent [19]

Niemann

[11] 4,408,705
[45] Oct. 11, 1983

[54] CYCLE CARRIER

[75] Inventor: Heinz Niemann, Herford, Fed. Rep. of Germany

[73] Assignee: Esge-Marby GmbH & Co. KG, Bielefeld, Fed. Rep. of Germany

[21] Appl. No.: 355,684

[22] Filed: Mar. 8, 1982

[30] Foreign Application Priority Data

Mar. 20, 1981 [DE] Fed. Rep. of Germany ....... 3110870

[51] Int. Cl.³ .............................. B62J 7/04; F16B 7/00
[52] U.S. Cl. ................................... 224/39; 224/30 R; 403/386; 403/400
[58] Field of Search ................. 224/30 R, 32 R, 32 A, 224/34, 39, 31, 33 R, 37; 403/365, 386, 407, 389, 400; 24/255 SL, 155 SD, 201 A

[56] References Cited

U.S. PATENT DOCUMENTS

| 2,818,871 | 1/1958 | Beaudry | 24/255 SL |
| 3,533,184 | 10/1970 | Kerr | 24/255 SL |
| 3,923,218 | 12/1975 | Niemann | 224/32 A |
| 3,945,089 | 3/1976 | Gagnon | 24/155 SD |
| 3,981,166 | 9/1976 | Madonna | 224/32 R X |

FOREIGN PATENT DOCUMENTS

| 1957855 | 5/1971 | Fed. Rep. of Germany ... 24/255 SL |
| 1002227 | 3/1952 | France | 280/289 R |
| 394334 | 6/1933 | United Kingdom | 24/201 A |
| 460672 | 2/1937 | United Kingdom | 224/30 R |
| 640850 | 7/1950 | United Kingdom | 224/30 R |
| 2031507 | 4/1980 | United Kingdom | 403/389 |

Primary Examiner—William Price
Assistant Examiner—Gary E. Elkins
Attorney, Agent, or Firm—Frishauf, Holtz, Goodman & Woodward

[57] ABSTRACT

To facilitate manufacture of lightweight bicycle carriers, in particular the attachment of supporting struts (6, 7) to a frame (1) having longitudinal support rods (3) for example formed of aluminum, the longitudinal support rods have injection-molded attachment elements (12) molded thereof, made of resiliently expandable material, with an open slit (18) extending to an opening (17) therein, permitting cross elements (10, 11) of the support struts (6, 7) to be snapped therein, the projecting portions (15) then being held closed by outer clamping or holding rings (19) slipped over the projecting portion and securing the cross elements (10, 11) of the support struts in irremovable position on the holding elements.

19 Claims, 6 Drawing Figures

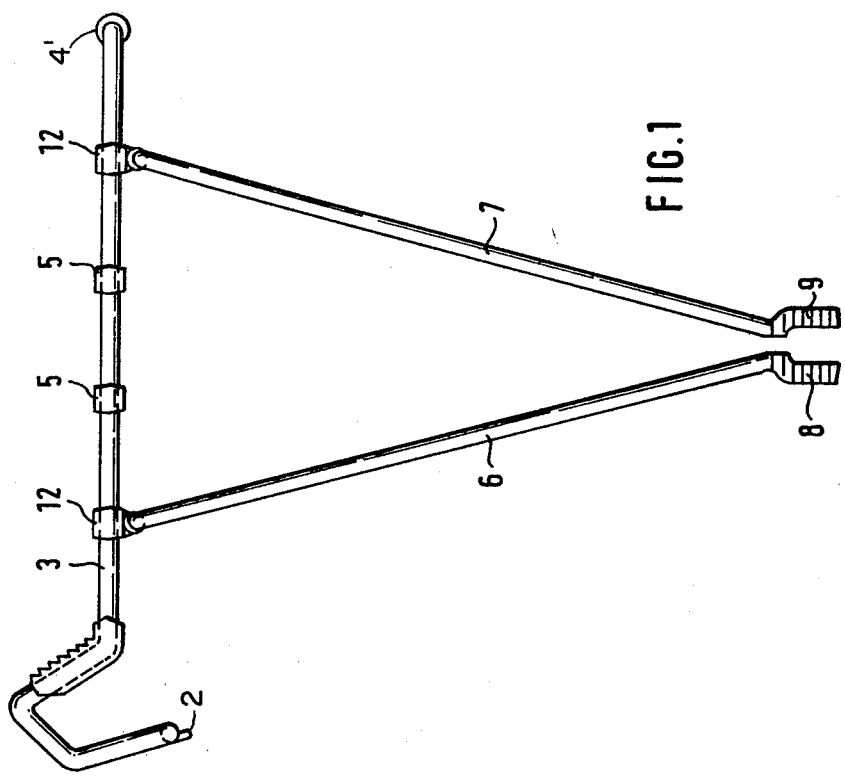
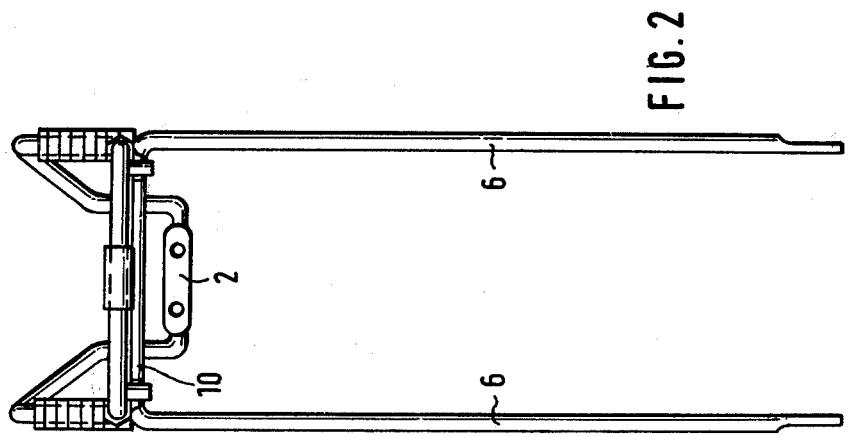

CYCLE CARRIER

The present invention relates to a carrier adapted to be mounted to bicycles and similar two-wheeled vehicles, and more particularly to a carrier construction which is easy to make and results in a sturdy lightweight carrier, suitable either for use over the rear or the front wheel of a bicycle.

BACKGROUND

A lightweight carrier of the type to which the present invention relates is shown and described in U.S. Pat. No. 4,113,158, by the inventor hereof and assigned to the assignee of the present application. This carrier utilizes longitutindal support elements and cross pieces. For lightweight construction, they are all made of aluminum. The cross pieces and the longitudinal support elements are interconnected by plastic elements which are injection-molded in place around both the support elements and cross pieces, at the same time to simultaneously form connecting elements as well as attachments for support rods struts arranged for attachment to a bicycle on, or adjacent to the axle of a wheel. The support struts are so secured in the injection molded plastic element at the time of molding thereof that they can rotate with respect thereto, or, for ease of packing and stacking the carriers for shipment, as well as for adjustment thereof on a bicycle. The resulting carrier is of extremely light weight and of pleasing appearance while being stable and capable of carrying substantial weight. All the plastic elements, which form interconnecting parts as well as bearings for the support struts can be injection molded in a single step.

The struts, which extend at right angles to the longitudinal support elements and cross-pieces, require comparatively complex injection molds, which result in a complicated injection apparatus and require careful introduction of the longitudinal support rods or struts as well as of the cross pieces, to prevent damage or destruction of the injecting molding apparatus.

THE INVENTION

It is an object to improve the construction of a cycle carrier such that the support struts can be easily secured to the longitudinal support rods, resulting in a frame which is simple, of pleasing appearance, and which can be readily made so that the injection molding apparatus can be simply constructed, while retaining the advantages of reliable interconnection between various support elements, cross pieces, and support struts.

Briefly, the frame includes plastic injection molded elements having a first portion surrounding the longitudinal frame elements or longitudinal support rods and a projecting portion which extends at right angles with respect to the longitudinal frame element and has an opening therein to receive a bent-over end portion of the support struts. These end portions are bent over at right angles with respect to their major extent to form, simultaneously, cross pieces for the longitudinal support rods. To insert the cross pieces formed by the struts, an insertion slit is formed extending from the opening to the outside of the projecting portion. The injection molding element is made of resilient material, permitting snap-in connection of the cross pieces of the support strut. To retain the support struts reliably in position in the plastic molding element, a holding or clamping ring is placed over the extending portion to reliably close the slit and prevent unintended expansion thereof and removal of the longitudinal carrier portion from the cross pieces of the support struts. The rings can be held in position by a sharp edge, a bead formed at the outside which is resiliently deflectable, or the like.

The manufacture is simple: First, the bearing portions for the carrier which surround the longitudinal support rods are injection molded thereon. This can readily be accomplished without complicated insertion of components into a mold, so that the mold itself is unlikely to be damaged. Subsequent assembly of the support struts to these portions can easily be done externally of the mold. The clamping rings provide for a stable and esthetically pleasing support of the support struts. They can be threaded on the support struts before final assembly.

The carrier construction can be adapted for carriers suitable to be placed above the rear wheel of a cycle, or above the front wheel thereof. The support elements, preferably, are bent inwardly and connected by a plastic connector which, thereby, connects the inwardly-bent elements into the equivalent of a cross brace, for further support of articles on the carrier.

DRAWINGS

FIG. 1 is a side view of the carrier in accordance with the present invention, constructed in the form of a rear wheel bicycle carrier;

FIG. 2 is an end view from the rear thereof;

Figure 3:
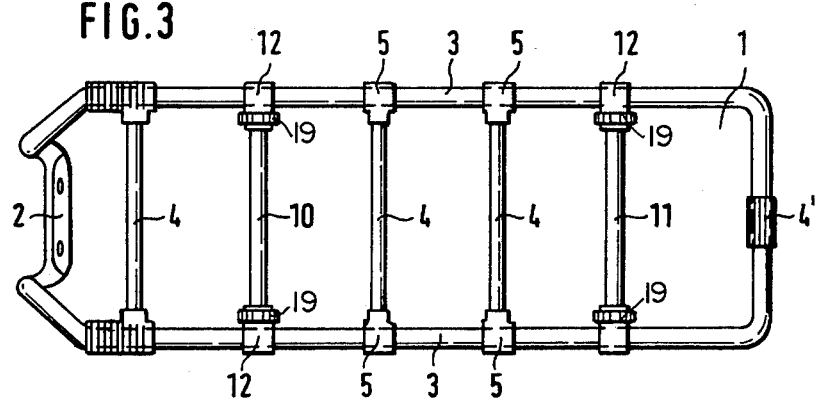
FIG. 3 is a top view.

The carrier, described in connection with the example of a rear-wheel bicycle carrier, has a frame 1 forming a support surface for luggage to be carried thereon. The frame 1 has an integral cross piece 2 adapted for connection to the rear fork of a bicycle. The frame 1, in top view, is generally rectangular and formed at its rear end with two inturned portions which are connected by a plastic connecting bushing 4'. The support surface additionally includes a number of cross elements 4, for example formed of aluminum rods or tubing. The longitudinal frame element 3 likewise can be aluminum rods or tubing, with the attachment cross piece 2 formed theron. The cross pieces 4 are connected to the longitudinal support rod portion 3 of the frame by plastic connectors 5. Support struts 6, 7 are connected to the longitudinal rods 3 with pivotable connections to permit pivoting the struts 6, 7, in suitable positions for attachment to a bicycle frame, for example to the axle thereof or for flat folding, for example for shipment. The two struts 6, 7 have end portions 8, 9 which are offset to permit ready attachment to the rear fork portion of a bicycle.

The support struts 6 as well as the strut 7 are transversely connected by a connecting portion 10, to form an integral, generally U-shpaed element. As best seen in FIG. 3, the cross portion 10 of support strut 6 as well as the cross portion 11 of support strut 7 form, simultaneously, cross elements of the frame 1. Of course, the generally U-shaped arrangement of the struts 6–10 and 7–11, respectively, may also be derived by forming the struts as L-shaped elements and connecting the intermediate portion corresponding to the cross pieces 10, 11 by plastic bushings similar to the bushing 4' which connects the inturned end portions of the longitudinal rods 3 to form the frame 1.

Figure 4:
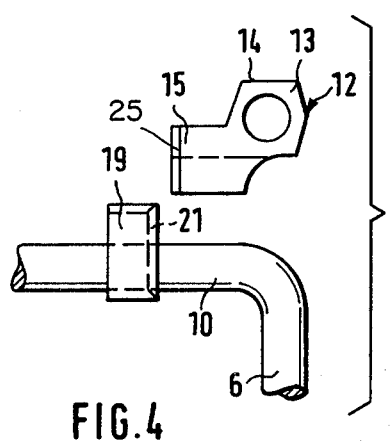
FIG. 4 is an exploded side view of an attachment element.
Figure 5:
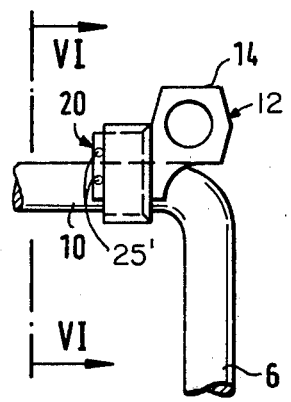
FIG. 5 is a side view of the attachment element with fragmentary portions of a support strut, showing the connection of the parts illustrated in FIG. 4.

The support struts 6, 7, with the generally cylindrical cross elements 10, 11 are pivotably supported in plastic bearing portions which, in accordance with the invention, are formed as single injection-molded elements, molded about the longitudinal support rods 3 of the frame 1. The detailed construction is best seen in FIGS. 4-6, to which reference will now be made.

Figure 6:
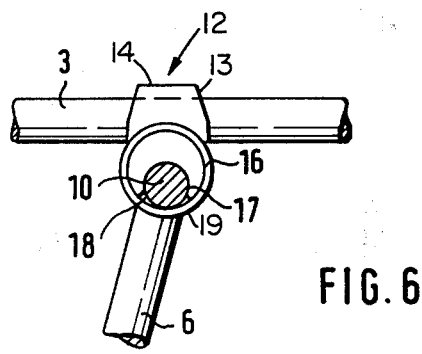
FIG. 6 is a fragmentary side view taken along the sight line VI of FIG. 5.

The injection-molded elements 12 have a first portion 13 which is molded around the longitudinal support rod 3—see FIG. 6. The upper portion of the part 13 is flattened, as seen at 14 to form a luggage support surface. A laterally extended portion 15 is molded integrally with the portion 13. The portion 15 has an outer cylindrical surface 16. A longitudinal bore or opening 17 extends transversely to the support rod 3. The opening 17 is open to the bottom, that is, an insertion slit 18 (FIG. 6) is formed therein, for example in a V-configuration, through which the cross piece 10, 11 of the respective strut 6, 7 can be snapped. A cylindrical clamping or holding ring 19, for example of metal is slid over the cylindrical outer surface 16 of the attachment element 15. The ring 19 may also be of plastic, but preferably is made of aluminum.

ASSEMBLY

The frame 1 is constructed by molding the end bushing 4' thereon and injection-molding the connector 5 to secure the cross pieces 4. The plastic elements 12 are molded on the longitudinal support rods 3 of the carrier. The plastic material is elastically deformable. Two clamping rings 19 are threaded on each one of the rods 6, 7, respectively, and centrally located on the respective cross piece 10, 11. The cross pieces 10, 11 are then snapped through the V-slits 18 under simultaneous corresponding elastic expansion of the element 12 until the cross piece has snapped into the opening 17. The rings 19 are then placed over the cylindrical surface 16, thus securely seating the walls of the opening 17 on the respective cross piece 10, 11. The opening 17 will form a bearing for the transverse element 10, 11, the transverse element itself being retained in the opening 17 in secure position so that it cannot be removed or loosened therefrom.

The clamping ring 19, preferably, is formed with a sharp edge at the free end surface 20, which is remote from the portion 13 of the element 12 so that, upon compression of the portion 15, the end of the ring 19 will at least slightly bite into the plastic material of the attachment portion 15, to thereby prevent undesired loosening or removal of the clamping ring 19 from the attachment element 15. Such an edge may be obtained, for example, by failure to remove cutting burrs, or the like. To facilitate placement of the clamping or holding ring 19, the side facing the portion 13 is preferably beveled as seen at 21 (FIG. 4).

The ring 19, additionally, can be secured in position by forming the end portion of the element 15 with a circumferential bend 25 (FIG. 4) or with engagement projections 25' (FIG. 5), for example in the form of small bumps, or a small groove which, together with the remaining material forms a sawtooth holding bead which expands just beyond the portion surrounded by the ring 19 due to the compressive force supplied by the ring 19.

The plastic material used for the elements 12, as well as for the other elements 4,5, for example, preferably is a plastic which has some inherent elasticity in order to permit snap-in connection of the cross elements 10, 11 into the openings 17 forming bearings for the strut 6, 7. The longitudinal rods 3, the cross rods 4, as well as the struts 6, 7, together with the cross pieces 10, 11, preferably are made of aluminum.

The attachment elements 15, as best seen in FIGS. 4 to 6, are so positioned that the portions 15 face inwardly, that is, towards each other. Thus, the cross elements 10, 11 can extend in the same plane, parallel to the plane of the frame 1. The longitudinal position of the struts 6, 7 can be made to fit the maximum width of the frame, that is, the struts 6, 7 do not extend beyond the widest lateral dimension of the frame—see for example FIGS. 2 and 3. In FIG. 3, the top view, the struts 6, 7 are hidden by the longitudinal frame elements 3. This is of advantage both with respect to appearance as well as safety since no laterally projecting parts will be formed. The stability of the frame, likewise, is enhanced by this arrangement.

The cylindrical outer surface of the projecting portion 15 is not a necessary feature, but advantageous since, then, the holding ring 19 likewise can be cylindrical, that is, a simple structural element. Placing the holding elements 12 to face each other has the additional advantage that injection molding of the elements 12 on the longitudinal bars or rods 3 is facilitated, and the mold as a whole made simpler, and hence of less expensive construction.

The form of the ring 19 to bite into the end area or zone of the projecting portion 15, preferably when coupled with projections 25, 25' has the advantage that the ring cannot be removed without a tool, and without damage to the element. Thus, undesired, or unauthorized disassembly is effectively prevented.

Various changes and modifications may be made within the scope of the inventive concept.

I claim:

1. Cycle carrier having
   an essentially rectangular frame (1) including longitudinal frame elements (3) and cross elements (4);
   support struts (6, 7) to support the frame from an axle amount of the cycle, said support struts (6, 7) extending in parallel planes essentially transverse to the plane defined by the rectangular frame;
   and means attaching the support struts to the frame comprising in accordance with the invention
   a plastic element (12) having a first portion (13) molded in place in surrounding relation to the longitudinal frame element (3) and having an integral projecting portion (15) extending at right angles with respect to the longitudinal frame element,
   the projecting portion being formed with an opening (17 therein) dimensioned to receive a bent-over portion (10, 11) of the support strut (6, 7), which is bent-over at right angles with respect to the major extend of the support struts;
   an insertion slit (18) extending from the opening to the outer circumference of the projecting portion;
   and means including a holding ring (19) surrounding the bent-over portion and adapted to be slid over the projecting portion in the region of the opening for closing off the insertion slit and retained on said projecting portion for holding the bent-over portion of the support strut in position on the frame.

2. Carrier according to claim 1, wherein the projecting portion (15) of the plastic injection-molded element has a cylindrical outer surface (16).

3. Carrier according to claim 1, wherein two injection-molded elements are provided, one on each one of the longitudinal frame elements, said projecting portions facing each other.

4. Carrier according to claim 1, wherein the longitudinal frame elements (3) and the support struts (6, 7) are located essentially in a single plane, the support struts being pivotably received within said openings (17) in the projecting portions.

5. Carrier according to claim 1, wherein the holding ring (19) has a sharp edge (20) at its free end adjacent the free end of the projecting portion, to bite into the plastic injection-molded material thereof.

6. Carrier according to claim 5, wherein the clamping ring at the side remote from the sharp edge is formed with a beveled inner portion.

7. Carrier according to claim 1, wherein said projecting portion is formed with a projection (25, 25') positioned at the free end thereof to retain the clamping ring in position and prevent its removal.

8. Carrier according to claim 1, wherein the projecting portion (15) of the plastic injection-molded element has a cylindrical outer surface (16);
wherein two injection-molded elements are provided, one on each one of the longitudinal frame elements, said projecting portions facing each other;
wherein the longitudinal frame elements (3) and the support struts (6, 7) are located essentially in a single plane, the support struts being pivotably received within said openings (17) in the projecting portions;
and further including means securing said holding rings in irremovable position on said projecting portion (15).

9. In a carrier adapted to be mounted above the wheel of a bicycle and the like, comprising a frame member (1) having longitudinal support rods (3) spaced from one another in generally parallel relation, support struts, (6, 7) each having cross-piece parts (10, 11) extending between the support rods (3) and depending strut portions (6, 7) adapted to be connected to the axle of said wheel, and connecting means (12) connecting said support struts integrally with said support rods (3) for enabling said strut portions to be pivoted towards one another for connection to said axle,
wherein in accordance with the invention,
for each said support struts (6, 7) said connection means (12) includes a respective pair of plastic elements (12) each having a first portion (13) molded in place around opposite portions of said support rods (3) and a second portion (15) projecting inwardly of said frame member (1), said second portions (15) each having an opening (17) larger in diameter than the diameter of said cross-piece portions (10, 11) and opening downwardly to a slit (18) of a width less than the diameter of said cross-piece portions (10, 11) whereby said cross-piece portions (10, 11) may be snapped in said opening (17) and held pivotally therein; and holding rings (19) surrounding each said cross-piece portion (10, 11) and adapted to be slid over respective second portions (15) for securing said cross-piece portions (10, 11) within said openings (17).

10. A carrier according to claim 9, wherein the second portions (15) each have a cylindrical outer surface adapted to have said rings (19) slid easily thereover.

11. A carrier according to claim 9, wherein said frame member (1) and the cross-piece portions (10, 11) lie essentially in a common plane.

12. A carrier according to claim 9, wherein said depending strut portions (6, 7) lie within planes extending vertically from said support rods (3) and do not extend laterally outwards beyond said vertical planes.

13. A carrier according to claim 9, wherein said first portions have generally horizontal top portions (14) extending upwardly from said frame member (1) to provide supporting surfaces for objects placed on said carrier.

14. A carrier according to claim 9, wherein the holding rings (19) each have a sharp edge portion (20) at its surface facing away from said first portions (13) for inhibiting removal of said holding rings (19).

15. A carrier according to claim 14, wherein the surface of said holding rings (19) adjacent said first portions (13) is formed with a bevelled inner portions.

16. A carrier according to claim 9, wherein the surface of said holding rings (19) adjacent said first portions (13) is formed with a bevelled inner portion.

17. A carrier according to claim 9, wherein in said second portion (15) includes portions extending upwardly from the end portion thereof remote from said first portion (13).

18. A carrier according to claims 9, further including means (20) securing said holding rings (19) in position on said second portions (15).

19. For use with a carrier adapted to be mounted above the wheel of a bicycle and the like, said carrier comprising a frame member (1) having longitudinal support rods (3) spaced from one another in generally parallel relation, support struts, (6, 7) each having cross-piece parts (10, 11) extending between said support rods (3) and depending strut portions adapted to be connected to the axle of said wheel;
means connecting said support struts integrally with said support rods for enabling said strut portions to be pivoted towards one another for connection to said axle,
wherein in accordance with the invention;
said connection means (12) includes plastic elements (12) each having a first portion (13) adapted to be molded in place around opposite portions of said support rods (3) and a second portion (15) projecting inwardly of said frame member (1), said second portions (15) each having an opening (17) larger in diameter than the diameter of said cross-piece portions (10, 11) and opening downwardly to a slit (18) of a width less than the diameter of said cross-piece portions (10, 11) whereby said cross-piece portions (10, 11) may be snapped in said opening (17) and held pivotally therein; and holding rings (19) surrounding each said cross-piece portions (10, 11) and adapted to be slid over respective second portions (15) for securing said cross-piece portions (10, 11) within said openings (17).

* * * * *